US010789090B2

(12) United States Patent
Koh et al.

(10) Patent No.: US 10,789,090 B2
(45) Date of Patent: Sep. 29, 2020

(54) METHOD AND APPARATUS FOR MANAGING DISAGGREGATED MEMORY

(71) Applicant: ELECTRONICS AND TELECOMMUNICATIONS RESEARCH INSTITUTE, Daejeon (KR)

(72) Inventors: Kwang Won Koh, Daejeon (KR); Kang Ho Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 6 days.

(21) Appl. No.: 16/185,833

(22) Filed: Nov. 9, 2018

(65) Prior Publication Data
US 2019/0138341 A1    May 9, 2019

(30) Foreign Application Priority Data

Nov. 9, 2017  (KR) .................. 10-2017-0148511
Sep. 17, 2018 (KR) .................. 10-2018-0110719

(51) Int. Cl.
| | | |
|---|---|---|
| *G06F 9/451* | (2018.01) | |
| *G06F 9/455* | (2018.01) | |
| *G06F 12/109* | (2016.01) | |
| *G06F 12/02* | (2006.01) | |

(52) U.S. Cl.
CPC ...... *G06F 9/45558* (2013.01); *G06F 12/0246* (2013.01); *G06F 12/109* (2013.01); *G06F 2009/45583* (2013.01); *G06F 2009/45591* (2013.01); *G06F 2212/1016* (2013.01); *G06F 2212/151* (2013.01); *G06F 2212/152* (2013.01); *G06F 2212/7201* (2013.01)

(58) Field of Classification Search
CPC . G06F 9/45558; G06F 12/0246; G06F 12/109
USPC ........................................................ 711/170
See application file for complete search history.

(56) References Cited

U.S. PATENT DOCUMENTS

| | | | |
|---|---|---|---|
| 8,793,427 B2 | 7/2014 | Lim et al. | |
| 2011/0167239 A1* | 7/2011 | Horn ..................... | G06F 11/34 |
| | | | 711/171 |
| 2015/0378892 A1* | 12/2015 | Tajima ................. | G06F 9/45558 |
| | | | 711/118 |

(Continued)

FOREIGN PATENT DOCUMENTS

KR    20170079899    7/2017

OTHER PUBLICATIONS

Koh, et al., "Disaggregated Cloud Memory with Elastic Block Management," IEEE Transactions on Computers, 2017, vol. 14 (8), pp. 1-13.

*Primary Examiner* — Than Nguyen

(57) ABSTRACT

The preset specification provides a method of managing a disaggregated memory in a virtual system. Herein, the disaggregated memory managing method includes: detecting a memory access pattern in a virtual machine node based on an operation of a virtual machine; and performing a memory operation by using a memory block in consideration of the memory access pattern, wherein the memory access pattern is variably set based on a time at which the operation of the virtual machine is performed, and the memory block dynamically changes in size based on the memory access pattern.

20 Claims, 9 Drawing Sheets

(56) References Cited

U.S. PATENT DOCUMENTS

| | | | |
|---|---|---|---|
| 2016/0179711 A1* | 6/2016 | Oikarinen | G06F 3/061 |
| | | | 710/40 |
| 2016/0188482 A1 | 6/2016 | Cha et al. | |
| 2016/0371196 A1 | 12/2016 | Koh | |
| 2017/0068562 A1 | 3/2017 | Oshins | |

* cited by examiner

```
Algorithm 1 Stretch operation
 1: procedure STRETCH(GPA)        △guest physical address
 2:     chead:= Look up a descriptor for head of GPA
 3:     bhead:= Look up a descriptor for head of buddy
    block
 4:     shead:= Look up a descriptor for head of super block
 5:     if block size of chead = block size of bhead
 6:     and bhead block exists in direct memory then
 7:         acquire lock of the buddy block
 8:         if link node is included in active list then
 9:             move to MRU position of active list
10:         end if
11:         copy status of link node into shead
12:         for all member descriptors do
13:             increase size of member descriptor
14:         end for
15:         release the buddy block's lock
16:         return stretched
17:     end if
18:     retutn not_stretched
19: end procedure
```

FIG. 3

Algorithm 2 Reduce operation
```
 1: procedure REDUCE(Block)                    ▷ an elastic block
 2:     if more than half of pages in the block are referenced
    then
 3:         return not_reduced
 4:     end if
 5:     acquire lock of all the member descriptors
 6:     for all member descriptors do
 7:         set size of member descriptor to zero
 8:         copy status of head to status of member descrip-
    tor
 9:     end if
10:     release lock of all the member descriptors
11:     return reduced
12: end procedure
```

FIG. 4

```
Algorithm 3 Locking protocol
 1: procedure LOCK_BLOCK(BLOCK)              ▷ an elastic block
 2:    loop
 3:        head:= look up head descriptor of the given
    block
 4:        block_size :=block_size of the target block
 5:        acquire the lock of the head
 6:        if block_size !=block_size of the target block then
 7:            release the lock of the head
 8:            continue          ▷ the block is changed during
    spinning
 9:        end if
10:        break
11:    end loop
12: end procedure                            ▷ lock is acquired
13: procedure UNLOCK_BLOCK(Block)            ▷ an elastic block
14:    release the lock of head descriptor
15: end procedure
```

FIG. 7

METHOD AND APPARATUS FOR MANAGING DISAGGREGATED MEMORY

CROSS REFERENCE TO RELATED APPLICATION

The present application claims priority to Korean Patent Application Nos. 10-2017-0148511, and 10-2018-0110719 filed Nov. 9, 2017, and Sep. 17, 2018, respectively, the entire contents of which is incorporated herein for all purposes by this reference.

BACKGROUND OF THE INVENTION

Field of the Invention

The present invention relates generally to a method and apparatus for managing a disaggregated memory by using a spatial locality so as to efficiently dynamically manage a memory in a virtual system providing the disaggregated memory.

Description of the Related Art

A virtual system providing a disaggregated memory means a system positioning a partial memory required in operation of a virtual machine to another system connected by using an I/O (input/output) rather than a physical machine operated by the corresponding virtual machine, and a virtual system using non-volatile memories supporting block addressing. By using the same, a chance is provided to provide a memory capacity that has increased as the recent in-memory computing environment becomes popular by using existing popular systems. When operating such a system, overcoming of performance degradation is essential for popularization of the corresponding system.

A representative method for improving performance in such a memory disaggregated system is to load a memory page to be used from a remote memory node in advance. However, when a corresponding memory system operates application programs as above, rather than considering a corresponding memory access pattern, a memory is used by transmitting the same in a page unit required from a remote memory paging system. In addition, when an abuse access request for all memories is transmitted, performance degradation occurs due to an abuse use of a connection network connecting a memory of a local machine with corresponding machines. For this, pre-fetching based on a memory access pattern of an application program widely used in a microarchitecture is required. However, a memory access pattern of the application programs varies according to application, time, position, and capacity of a local memory, and thus static temporal profiling is limited in optimizing the system.

The foregoing is intended merely to aid in the understanding of the background of the present invention, and is not intended to mean that the present invention falls within the purview of the related art that is already known to those skilled in the art.

SUMMARY OF THE INVENTION

An object of the present invention is to improve system performance by dynamically determining, by a virtual system supporting a disaggregated memory, a memory access pattern and reducing a number of remote memory accesses.

Another object of the present invention is to provide a method of decreasing performance degradation by reducing a number of memory accesses by using the above method.

Still another object of the present invention is to provide a method of decreasing a delay time occurring during a practical memory access by reducing abuse usage of a memory bandwidth used for connecting nodes by using the above method.

Still another object of the present invention is to provide dynamic profiling for a memory access of a virtual machine so as to achieve the above objects.

Technical problems obtainable from the present disclosure are not limited by the above-mentioned technical problems, and other unmentioned technical problems may be clearly understood from the following description by those having ordinal)/skill in the technical field to which the present disclosure pertains.

According to an embodiment of the present invention, there is provided a method of managing a disaggregated memory in a virtual system. Herein, the method of managing the disaggregated memory may include: detecting, by a virtual machine node, a memory access pattern based on an operation of a virtual machine; and performing, by the virtual machine node, a memory operation by using a memory block in consideration of the memory access pattern.

Herein, the memory access pattern may be variably set based on a time at which the operation of the virtual machine is performed, and the memory block may dynamically change in size based on the memory access pattern.

Herein, the memory operation may include at least one of a load operation, a store operation, an operation of mapping a guest physical address (GPA), and an operation of un-mapping a GPA.

In addition, according to an embodiment of the present invention, an apparatus for managing a disaggregated memory in a virtual system may include: a memory; and a processor controlling the memory. Herein, the processor may detect a memory access pattern based on an operation of a virtual machine in a virtual machine node, and perform a memory operation by using a memory block in consideration of the memory access pattern. Herein, the memory access pattern may be variably set based on a time at which the operation of the virtual machine is performed, and the memory block may dynamically change in size based on the memory access pattern.

Herein, the memory may include a local memory and a remote memory.

In addition, the memory operation performed by the processor may include at least one of a load operation, a store operation, an operation of mapping a GPA, and an operation of un-mapping a GPA.

In addition, according to an embodiment of the present invention, a virtual system for managing a disaggregated memory may include: a virtual machine node controlling an operation of a virtual machine; and a memory node controlling a memory operation. Herein, a disaggregated memory manager of the virtual machine node may detect a memory access pattern based on an operation of the virtual machine, and perform a memory operation by using a memory block in consideration of the memory access pattern. Herein, the memory access pattern may be variable set based on a time at which the operation of the virtual machine is performed, and the memory block may dynamically change in size based on the memory access pattern.

In addition, the memory operation performed by the disaggregated memory manager may include at least one of a load operation, a store operation, an operation of mapping a GPA, and an operation of un-mapping a GPA.

The following features may be commonly applied to a method, apparatus, and system for managing a disaggregated memory.

According to an embodiment of the present invention, the load operation of the memory operation may be an operation of loading at least one memory page from a remote memory to a local memory. Herein, the memory block may be configured with a plurality of memory pages.

Herein, a number of memory pages loaded to the local memory is determined based on a stretch operation.

In addition, according to an embodiment of the present invention, the store operation of the memory operation may be an operation of storing at least one memory page from a local memory to a remote memory. Herein, the memory block may be configured with a plurality of memory pages.

In addition, according to an embodiment of the present invention, a number of memory pages loaded to the remote memory may be determined based on a reduce operation.

In addition, according to an embodiment of the present invention, when storing of the memory block based on the store operation occurs, a continuity score of the memory block may be determined, and whether or not to maintain the size of the memory block may be determined by comparing the determined continuity score with a threshold value.

Herein, according to an embodiment of the present invention, when the continuity score is equal to or greater than the threshold value, the size of the memory block may be maintained, and when the continuity score is smaller than the threshold value, the memory block may be disaggregated by a block of a minimum unit based on the reduce operation, and stored in the remote memory.

Herein, according to an embodiment of the present invention, the block of the minimum unit may be configured with one memory page.

In addition, according to an embodiment of the present invention, a state of the memory block and a position of the memory block may be managed based on a descriptor.

Herein, according to an embodiment of the present invention, the descriptor may include at least one of whether or not the memory block is present in a local memory or in a remote memory, whether or not the memory block is mapped to an address space, and size information of the memory block.

In addition, according to an embodiment of the present invention, the memory block may have a size of $2^n$ times of a memory page and dynamically changes in size. Herein, n may be a constant.

Herein, according to an embodiment of the present invention, a start address of the memory block may be variably set based on the size of the memory block.

According to the present invention, in a virtual system supporting a disaggregated memory, system performance can be improved by dynamically determining a memory access pattern and reducing a number of remote memory accesses.

According to the present invention, a method is provided where performance degradation is decreased by reducing a number of memory accesses by using the above method.

According to the present invention, a method is provided where a delay time occurring during a practical memory access is decreased by reducing abuse usage of a memory bandwidth used for connecting nodes by using the above method.

According to the present invention, dynamic profiling for a memory access of a virtual machine can be provided so as to achieve the above objects.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The above and other objects, features and other advantages of the present invention will be more clearly understood from the following detailed description when taken in conjunction with the accompanying drawings, in which:

FIG. 3 is a view showing a pseudo code of a stretch operation according to an embodiment of the present invention.

FIG. 4 is a view showing a pseudo code of a reduce operation according to an embodiment of the present invention;

FIG. 7 is a view showing a locking protocol in consideration of dynamic change of a block according to an embodiment of the present invention;

DETAILED DESCRIPTION OF THE INVENTION

Figure 1:
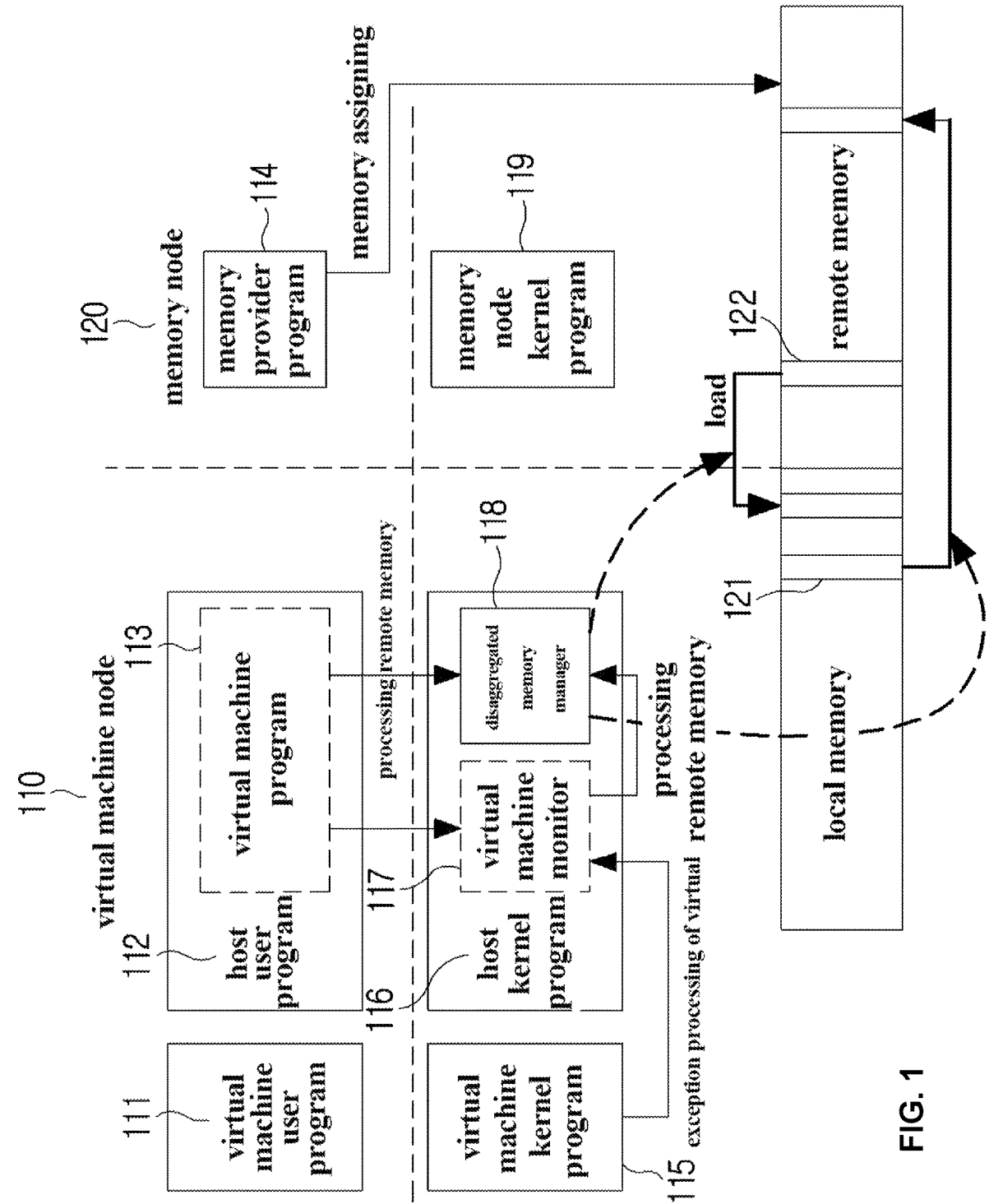
FIG. 1 is a view showing a configuration of a disaggregated memory manager.

In the following detailed description, certain exemplary embodiments of the present invention have been shown and described simply by way of illustration. As those skilled in the art would realize, the described embodiments may be modified in various different ways, without departing from the spirit or scope of the present invention.

In the following description, if a detailed description about well-known functions or configurations may make the subject matter of the disclosure unclear, the detailed description will be omitted. In addition, in the drawings, parts not related to the description of the present invention are omitted, and like parts are denoted by similar reference numerals.

In the present invention, it is to be understood that the terms such as "including" or "having", etc. are intended to indicate the existence of the features, numbers, operations, actions, components, parts, or combinations thereof disclosed in the specification, and are not intended to preclude the possibility that one or more other features, numbers, operations, actions, components, parts, or combinations thereof that may exist or may be added.

In the present invention, it will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

In the present invention, the components that are distinguished from each other are intended to clearly describe the respective features, and do not necessarily mean that the components are separated. That is, a plurality of components may be integrated into one hardware or software unit, or one component may be distributed into a plurality of hardware or software units. Accordingly, such integrated or distributed embodiments are included within the scope of the present invention, unless otherwise noted.

In the present invention, the components described in the various embodiments are not necessarily essential components, and some may be optional components. Accordingly, embodiments consisting of a subset of the components described in an embodiment are also included in the scope of the present invention. In addition, embodiments including other components in addition to the components described in the various embodiments are also included in the scope of the present invention.

FIG. 1 is a view showing a configuration of a disaggregated memory manager.

Referring to FIG. 1, a virtual system including a disaggregated memory may be provided. In detail, in the virtual system, a disaggregated memory manager 118 may be present. Herein, the disaggregated memory manager 118 may process remote memory access occurring in a virtual machine node 110. In an embodiment, when the virtual machine node 110 wants to access a remote memory, the disaggregated memory manager 118 may load the remote memory to a local memory. In addition, the disaggregated memory manager 118 may store the local memory to the remote memory. In an embodiment, the disaggregated memory manager 118 may store a first memory page 121 of the local memory to the remote memory on the basis of an operation of the virtual machine node 110. Herein, the first memory page 121 may be an arbitrary memory page present in the local memory, but it is not limited to the above embodiment. In other words, the disaggregated memory manager 118 may store the local memory to the remote memory. In addition, the disaggregated memory manager 118 may load a second memory page 122 present in the remote memory to the local memory on the basis of an operation of the virtual machine node 110. Herein, the second memory page 122 may be an arbitrary memory page present in the remote memory, but it is not limited to the above embodiment. Herein, the disaggregated memory manager 118 may map the loaded local memory to an address space used by the virtual machine node 110, and by the same, the virtual machine node 110 may use the loaded local memory. In other words, kernel or application programs operating in a virtual machine are enabled to access the corresponding memory. Meanwhile, the disaggregated memory manager 118 may store a memory that is not accessed by the virtual machine node 110 in the remote memory. In other words, the disaggregated memory manager 118 may determine a memory that is used by the virtual machine node 110, load the same to the local memory, and store an unused memory in the remote memory.

Herein, referring to FIG. 1, in the virtual machine node 110 of a kernel level, a virtual machine kernel program 115 and a host kernel program 116 may be present. Meanwhile, in a memory node 120 of a kernel level, a memory node kernel program 119 may be present. Herein, the disaggregated memory manager 118 described above may control remote memory access processing by using the host kernel program 116 on the basis of the virtual machine kernel program 115. In other words, in a user level, monitoring of a virtual machine is performed by a virtual machine monitor 117 on the basis of the virtual machine program 111, and based on the same, the disaggregated memory manager 118 may perform remote memory access processing.

Herein, in an embodiment, in the virtual system including the disaggregated memory, performance degradation may occur due to remote memory access. In detail, when providing remote memory access, a swap system provided by conventional operating systems provides an access service to a corresponding remote memory by simply performing swap for a required page. However, since a storage device connected to an IO (input/output) bus, a remote memory connected to the IO bus, and a bit-addressing required from a processor and which is provided by block-addressing from a memory using an NAND element such as NVDIMM-F are not provided, and thus a problem may occur.

In addition, in an embodiment, as described above, a representative method of improving performance of the virtual system including the disaggregated memory is to load a memory page to be loaded from a remote memory node in advance. However, when a corresponding memory system operates application programs, the system does not consider a memory access pattern, and when a memory required from a remote memory paging system is transmitted in a page unit, a waste of memory pages may occur. In addition, when abuse access request for all memories is transmitted, performance degradation occurs due to an abuse use of a connection network connecting a memory of a local machine with corresponding machines.

For this, in the virtual system including the disaggregated memory, performance of the system may be improved by reducing a number of unnecessary remote memory accesses by dynamically determining a memory access pattern. Accordingly, unnecessary memory accesses are reduced, and performance degradation may be prevented so that abuse use of a memory bandwidth used for connecting nodes may be prevented. By preventing abuse use of the bandwidth, a delay time occurring during practical access to a memory may be reduced.

In order to achieve the above, profiling for memory access of a virtual machine may be required, and the profiling may be classified into static profiling, and dynamic profiling. Herein, static profiling is not performed during operation of a virtual machine, and thus a profiling cost that is dynamic may be reduced, but static profiling is limited in identifying a position of a memory which is dynamically determined and a memory access pattern that temporally changes according to the same.

Considering the above situation, the disaggregated memory manager 118 operating in a virtual machine may continuously determine spatial locality of a memory managed during which the virtual machine is in operation. Accordingly, the disaggregated memory manager may perform loading, storing, mapping and un-mapping to a guest physical address (GPA), etc. which are memory operations. Herein, the disaggregated memory manager may perform the operation in a grout unit of continuous memory pages having a spatial locality when performing the above operations.

Figure 2:
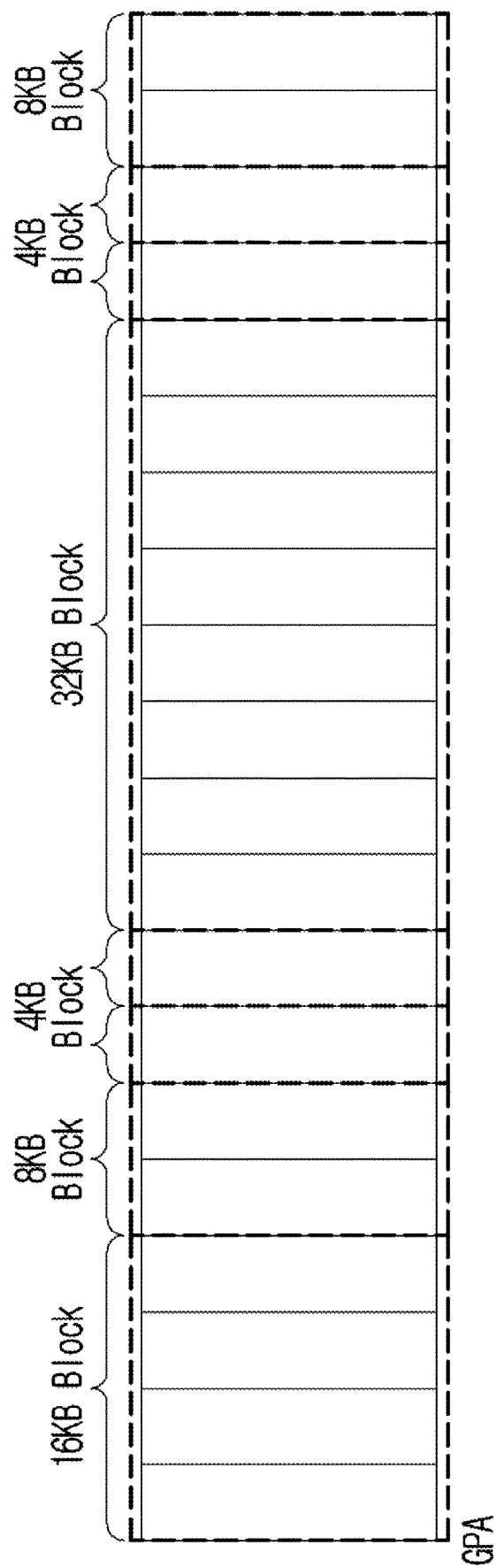
FIG. 2 is a view of a method of configuring a flexible virtual memory block according to an embodiment of the present invention.

In an embodiment, FIG. 2 is a view showing a flexible virtual memory block. Referring to FIG. 2, a group of continuous memory pages may be defined as a flexible virtual memory block. Herein, a single block may be always present in a local memory or in the same remote memory, and have an identical state. In addition, a size of the corresponding memory may dynamically vary, and the size may have a size that is multiple of $2^{11}$ (n is a constant) of a page defined in a micro-architecture.

In an embodiment, considering a structure of an Intel 64 computer, a size may increase as 4 KB, 8 KB, 16 KB, 32 KB, 64 KB, etc. In addition, a start address of a block may have an address sorted in a size of the corresponding block. In other words, a 4 KB block, an 8 KB block, a 16 KB block, a 32 KB block, and a 64 KB block may respectively have a start address in association with blocks having 11, 12, 13, 14, 15 least significant bits (LSB) of 0, and may be respectively identified by the start addresses. As described above, in order to dynamically change a block size, a stretch operation stretching a size of an arbitrary block and a reduce operation reducing a size of an arbitrary block on the basis of information provided when performing a memory management may be performed.

In an embodiment, FIG. 3 is a view showing a pseudo code of a stretch operation.

Referring to FIG. 3, a stretch operation may determine a number of pages to be loaded from a remote memory when processing access to an arbitrary remote memory. In addition, the corresponding operation may be performed when access to an arbitrary remote memory occurs. In other words, the corresponding operation may be performed when performing loading from a remote memory to a local memory. Herein, a block adjacent to a remote block to which access has occurred may be considered. When a block sorted as an adjacent block has a size and a state identical to a target block, two blocks may be merged into one by determining that a spatial locality is present for the two blocks. Then, the block merged by the disaggregated memory manager may be loaded to a local memory. Accordingly, the block having increased in size may increase in life in a memory management system since the same has new memory access. In other words, when a size and a state of adjacent blocks are identical, the blocks may be merged into one on the basis of a stretch operation, and loaded to the local memory. In an embodiment, when a size and a state of adjacent blocks are identical, the memory may be increased in size by performing sequential memory access, and when adjacent blocks are irrelevant, random access may be performed.

FIG. 4 is a view showing a pseudo code of a reduce operation. Referring to FIG. 4, on the contrary to FIG. 3, a reduce operation may be an operation performed when performing storing of a block present in a local memory in a remote memory. In an embodiment, for an arbitrary block, each of pages may have a continuity score of 1/(block size). Herein, evaluation may be performed by adding respective scores, and whether or not a continuity score of a corresponding block is equal to or greater than a threshold value may be determined. Herein, the threshold value may be changed and set to a value that becomes a reference, but it is not limited to the above embodiment.

When the continuity score is equal to or greater than the threshold value, a size of the corresponding block remains as it is, otherwise the corresponding block may be divided into a plurality of blocks having a size of 4 KB page. In other words, as shown in FIG. 2, the block may be divided by a 4 KB block that is a minimum unit of a single page. By performing management for a block size as above, for sequential memory access, increasing in size of a block may be performed, and for random memory access, decreasing in size of a block may be aggressively performed, and thus performance of sequential memory access may be improved and performance degradation of random memory access may be prevented.

For the same, a state of each memory block and a data position of the corresponding memory may be managed by using a descriptor for a memory of a virtual machine. In an embodiment, whether or not data of a 4 KB block which starts from 0x10000 of an arbitrary GPA is present in a local memory or in a remote memory may be represented on the basis of the descriptor. In addition, whether or not a memory is mapped to an address space may be represented by using the descriptor. In addition, information of a block size for a spatial locality may be determined by using the descriptor. In addition, the descriptor includes a lock parameter for synchronization mechanism such that a concurrence problem does not occur when a corresponding page is present in a remote memory and performing access for the same is processed.

Figure 5:
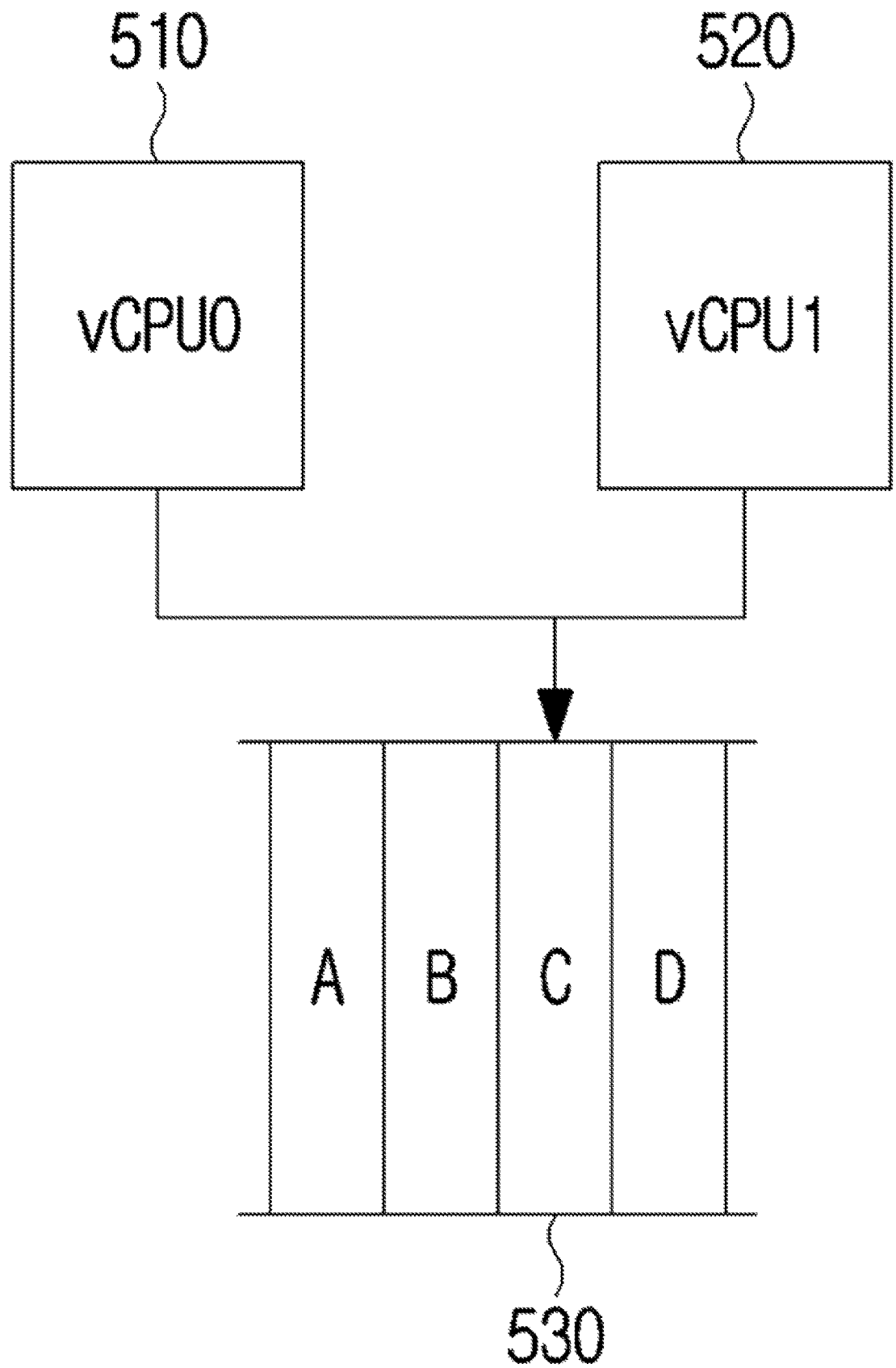
FIG. 5 is a view showing a concurrence memory access method between two virtual machine processors according to an embodiment of the present invention.

In an embodiment, referring to FIG. 5, in order to process a single block in two threads vCPU0 510 and vCPU1 520 different from each other, synchronization between two threads vCPU0 510 and vCPU1 520 may be required. In an embodiment, when the vCPU0 thread 510 has started to process access to memory block C first, the vCPU1 thread does not need to process the corresponding job. Waiting for processing of a preceding access may be required or any one operation may be reflected in the system by performing access processing.

Herein, in an embodiment, a block that dynamically changes in size may use a lock parameter present in a head descriptor present in the front of a memory page descriptor constituting a corresponding block as a lock parameter for synchronization. In other words, when two virtual machine processors simultaneously perform access to an identical memory and perform process for the corresponding memory, synchronization may be performed by using a lock parameter present in a head descriptor among descriptors belonging to the block.

Figure 6:
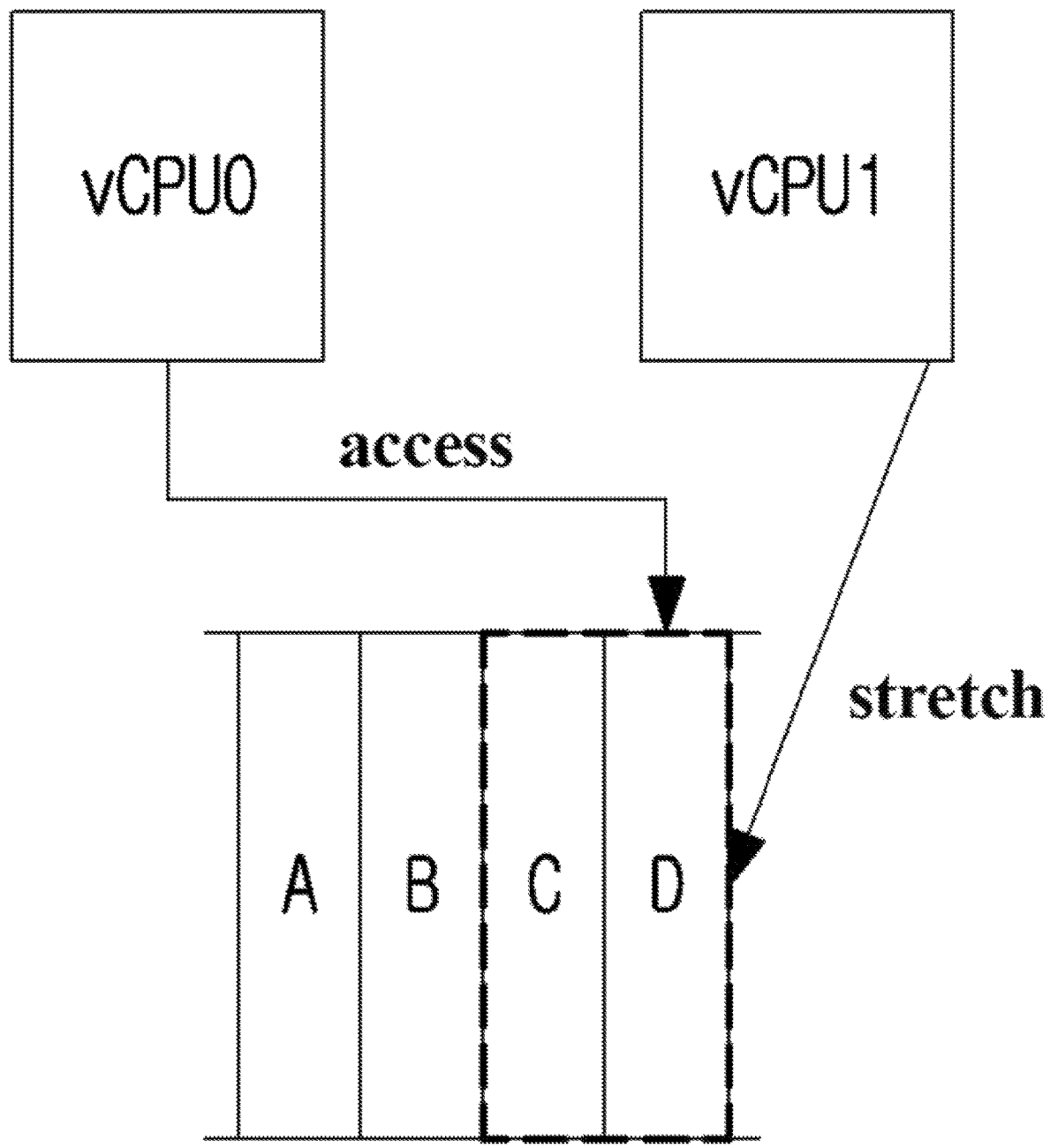
FIG. 6 is a view showing a method of solving a concurrence problem of stretch operation memory access processing according to an embodiment of the present invention.

Herein, in an embodiment, FIG. 6 is a view showing a case where concurrence occurs when performing a stretch operation and memory access processing.

Referring to FIG. 6, for two vCPU threads 610 and 620 different from each other, when the vCPU0 thread 610 performs access processing to a block D of 4 KB memory and at the same time the vCPU1 thread 620 performs access processing to a block C of 4 KB memory, a stretch operation may be performed for the memory block C and the memory block D. Herein, the vCPU0 thread 610 may use a lock parameter present in a head descriptor of the memory block D based on the above description. Meanwhile, the vCPU1 thread 620 may use a lock parameter of a head descriptor of the memory block C. In other words, performing of a stretch operation and memory access processing may simultaneously occur and cause a problem in that which operation of the two threads is performed.

Herein, in an embodiment, based on a pseudo code of a stretch operation described with FIG. 3, the vCPU1 thread 620 may possess locking for two blocks that becomes a target of a stretch operation. In other words, the vCPU1 thread 620 may possess a lock parameter of a head descriptor of the block C and a lock parameter of a head descriptor of the block D.

Herein, when the vCPU0 thread 610 possesses locking for the block D after a stretch operation, the block D becomes a block dependent on the block C, and thus may not become a target of memory access processing further. Accordingly, in order to solve a synchronization problem based on the above description, atomic update has to be available for a size of all blocks.

For the same, a locking protocol may be used as shown in FIG. 7. In an embodiment, a stretch operation and a reduce operation may update, for a target of input blocks and output blocks of the corresponding operation, a parameter presenting a block size while possessing lock of the corresponding blocks. In other words, when a size is not matched after updating a parameter representing a block size, locking is released and performing access is allowed so that a concurrence problem when performing access processing for the corresponding blocks may be solved.

According to the above description, a limit in identifying a memory position is dynamically determined during static profiling, and a memory access pattern temporally changing in association thereto may be overcome, but it is not limited to the above embodiment.

Figure 8:
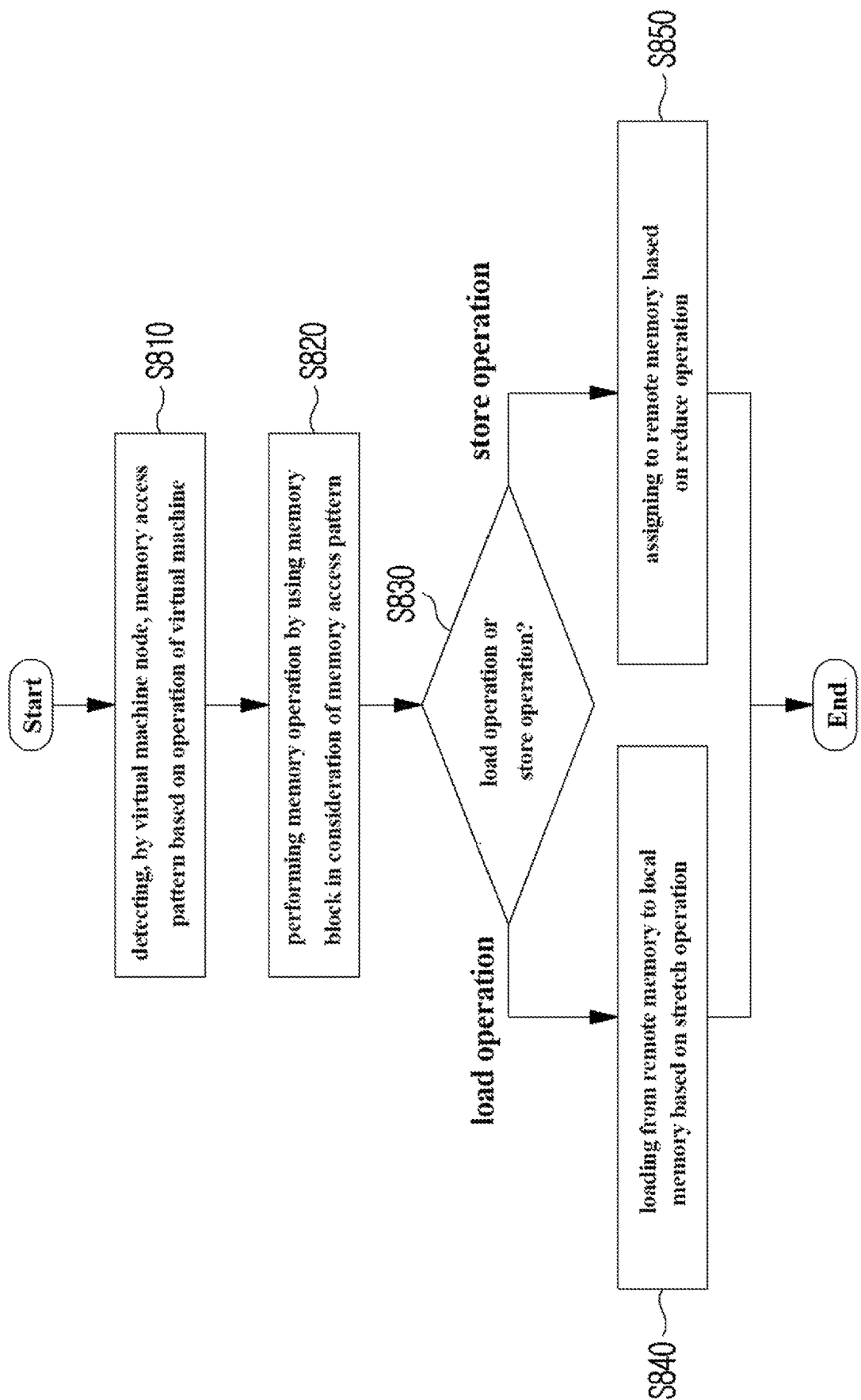
FIG. 8 is a view showing a method of managing a disaggregated memory according to an embodiment of the present invention.

FIG. 8 is a view showing a method of managing a disaggregated memory.

Referring to FIG. 8, in S810, a memory access pattern may be detected on the basis of an operation of a virtual machine in a virtual machine node. Herein, as described with reference to FIGS. 1 to 7, the disaggregated memory manager may perform memory access processing on the basis of the operation of the virtual machine. Herein, in an embodiment, the virtual machine node, memory node, etc. of FIG. 1 may be a logical configuration. In addition, the disaggregated memory manager may also be a logical configuration, and may be an entity representing a subject of managing the disaggregated memory. In an embodiment, the subject performing the above operation may be a processor. In other words, a memory and a processor may be present in an apparatus, and the processor may perform operations of managing the disaggregated memory on the basis of entities disclosed in FIG. 1 by organically operating in association with the memory. However, for the convenience of description, in the above description and in the following description, the subject is disclosed as each node and the disaggregated memory manager Subsequently, in S820, the disaggregated memory manager may perform a memory operation by using a memory block in consideration of the memory access pattern. Herein, as described with reference to FIGS. 1 to 7, a memory access pattern may be variably set on the basis of a time of performing operation for a virtual machine. In addition, a memory access pattern may be variably set according to other components, but it is not limited to the above embodiment. The disaggregated memory manager may perform a memory operation by using a memory block on the basis of the memory access pattern described above. Herein, the memory block may have a unit of a group formed with a plurality of consecutive memory pages. In addition, a size of the memory block may vary as described above. In addition, a memory operation may include at least one of a load operation, a store operation, mapping operation to a GPA, and un-mapping operation to a GPA as described above. In other words, based on an operation of the virtual machine of the virtual machine node, a load operation where a memory block is loaded from a remote memory to a local memory may be performed. In addition, based on an operation of the virtual machine of the virtual machine node, a store operation where a memory block is stored from a local memory to a remote memory may be performed. Meanwhile, an operation of mapping or un-mapping a memory on the basis of a GPA may be performed, but it is not limited to the above embodiment.

Herein, in an embodiment, in S830, additional operations different from each other may be performed on the basis of the performed operation. Herein, as described with reference to FIGS. 1 to 7, in S840, when a load operation is performed and a size and a state of adjacent memory block are identical to the accessed memory block, sizes of the blocks may be merged on the basis of a stretch operation, and the merged memory block may be loaded to the local memory as described above.

Meanwhile, in S850, in a store operation, based on a continuity score of pages within a block to be stored, a continuity score of the block may be determined. Herein, the continuity score may be compared with a threshold value, when the continuity score is smaller than the threshold value, the block may be divided by a minimum unit so as to be stored in a remote memory as described above.

Figure 9:
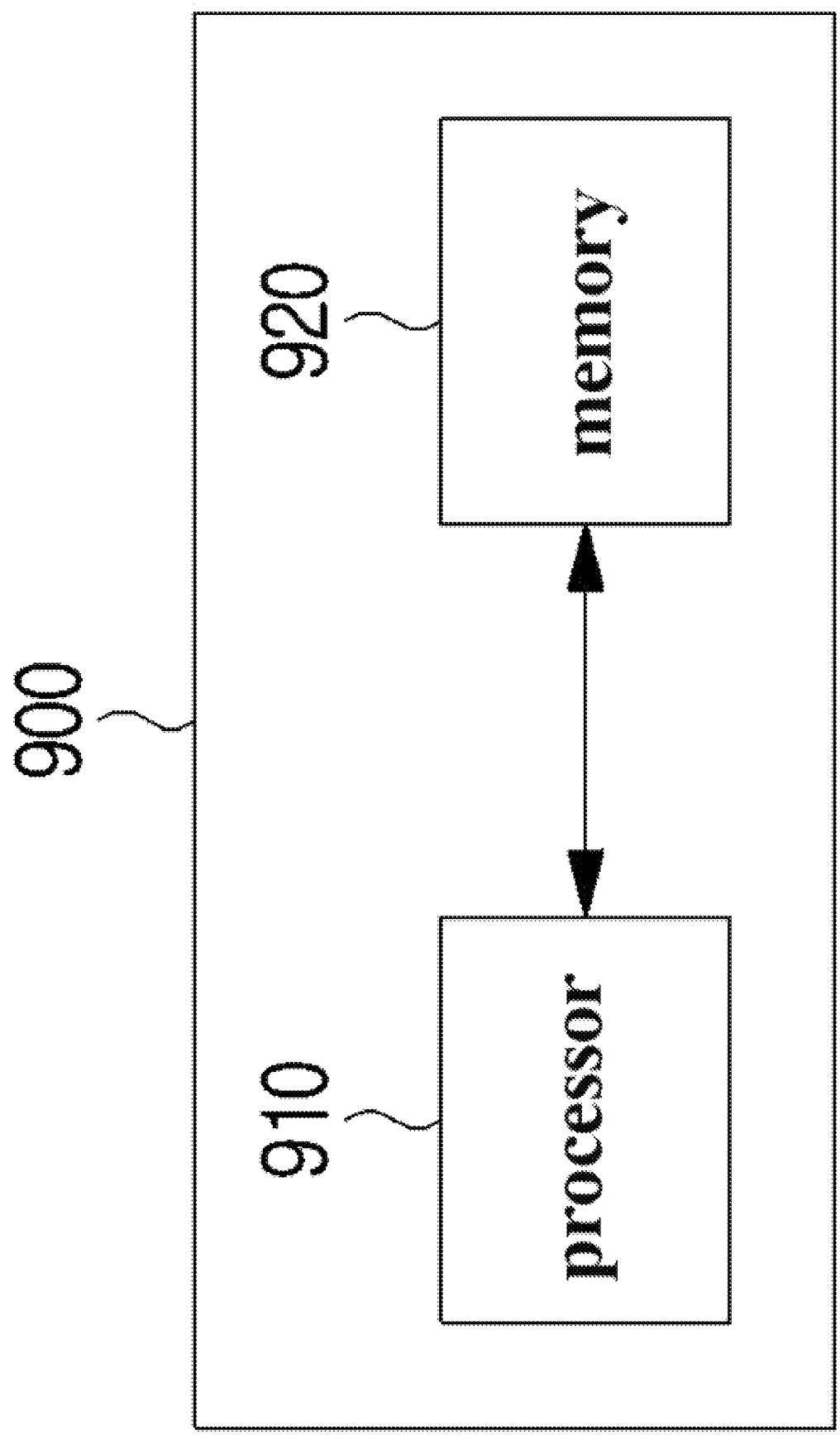
FIG. 9 is a view showing an apparatus for managing a disaggregated memory according to an embodiment of the present invention.

FIG. 9 is a view showing a configuration of an apparatus for managing a disaggregated memory. Referring to FIG. 9, a disaggregated memory managing apparatus 900 may be configured with a memory 910 and a processor 920. Herein, in an embodiment, the processor 920 may be a hardware unit corresponding to each program, each mode, and a manager of FIG. 1 described above. In other words, the configuration of FIG. 1 may be a logical entity and operate on the basis of the processor 920 described above. However, in order to identify detailed operations, it may be disclosed as FIG. 1, but it is not limited to the above embodiment. Meanwhile, the memory 910 may be configured with a local memory and a remote memory as shown in FIG. 1. In other words, the memory 910 may be a disaggregated memory form, and operate on the basis of a disaggregated memory as described above. In addition, in an embodiment, the memory 910 may be a hardware unit, and may be a configuration operating on the basis of an operation performed by a logical entity described above. In other words, the present invention may be a method of implementing a disaggregated memory on the basis of the memory 910 and the processor 920, but it is not limited to the above embodiment.

The method or algorithm descried in a relevance to the embodiments disclosed in the present specification may be implemented in a hardware module, a software module, or a combination thereof which is executed by a processor. The software module may be included in a storage medium (that is, memory or storage or both) such as a RAM memory, a flash memory, a ROM memory, an EPROM memory, an EEPROM memory, a register, a hard disk, a removable disk, and a CD-ROM. The exampled store medium is coupled to the processor, and the processor may read information from the storage medium, and write information in the storage medium. On the other way, the storage medium may be integrated with the processor. The processor and the storage medium may be integrated in an application specific integrated circuit (ASIC). The ASIC may be included in a user terminal. Alternatively, the processor and the storage medium may be included the user terminal as an individual component.

The exemplary method of the present invention is shown in series for simplicity, but this is not intended to limit the order in which the operations are performed. Operations may be performed simultaneously or in a different order if necessary. In order to implement of the present invention, other steps other than the disclosed steps, remaining steps except for some steps, additional steps except for some steps may be included.

It is to be understood that the various embodiments of the present invention are not intended to be all-inclusive and are intended to illustrate an exemplar/aspect of the present invention, and the elements described in the various embodiments may be applied independently or in combination of two or more the present invention.

In addition, various embodiments of the present invention may be implemented in hardware, firmware, software, or a combination thereof. When the embodiment is implemented by hardware, the embodiment may be implemented by at least one of application specific integrated circuits (ASICs), digital signal processors (DSPs), digital signal processing devices (DSPDs), programmable logic devices (PLDs), field programmable gate arrays (FPGAs), general processors, controllers, micro-controllers, micro processors, etc.

The scope of the present invention includes software or machine-executable instructions (for example, OS, application, firmware, program, etc.) enabling operations according to the various embodiments to be executed in an apparatus or computer, and a non-transitory computer-readable medium storing the above software or instructions to be executed in an apparatus or computer.

What is claimed is:

1. A method of managing a disaggregated memory, wherein a disaggregated memory is managed in a virtual system, the method comprising:
    detecting a memory access pattern in a virtual machine node based on an operation of a virtual machine; and
    performing a memory operation by using a memory block in consideration of the memory access pattern,
    wherein the memory access pattern is variably set based on a time at which the operation of the virtual machine is performed, and
    wherein the memory block dynamically changes in size based on the memory access pattern, including the memory block dynamically increasing in size when the memory operation includes a load operation that loads the memory block from a remote memory to a local memory.

2. The method of claim 1, wherein the memory operation includes at least one of the load operation, a store operation, an operation of mapping a guest physical address (GPA), and an operation of un-mapping a GPA.

3. The method of claim 1, wherein the load operation of the memory operation is an operation of loading at least one memory page from the remote memory to the local memory, and the memory block is configured with a plurality of memory pages.

4. The method of claim 3, wherein a number of memory pages loaded to the local memory is determined based on a stretch operation.

5. The method of claim 4, wherein when a block size and a block state of a second memory block adjacent are identical to a first memory block to which access has occurred based on the load operation, the first memory block and the second memory bock are merged into one based on the stretch operation, and the merged memory block is loaded to the local memory.

6. The method of claim 2, wherein the store operation of the memory operation is an operation of storing at least one memory page from the local memory in the remote memory, and the memory block is configured with a plurality of memory pages.

7. The method of claim 6, wherein a number of memory pages stored in the remote memory is determined based on a reduce operation.

8. The method of claim 7, wherein when storing of the memory block based on the store operation occurs, a continuity score of the memory block is determined, and whether or not to maintain the size of the memory block is determined by comparing the determined continuity score with a threshold value.

9. The method of claim 8, wherein when the continuity score is equal to or greater than the threshold value, the size of the memory block is maintained, and
    when the continuity score is smaller than the threshold value, the memory block is disaggregated by a block of a minimum unit based on the reduce operation, and stored in the remote memory.

10. The method of claim 9, wherein the block of the minimum unit is configured with one memory page.

11. The method of claim 1, wherein a state of the memory block and a position of the memory block are managed based on a descriptor.

12. The method of claim 11, wherein the descriptor includes at least one of whether or not the memory block is present in a local memory or in a remote memory, whether or not the memory block is mapped to an address space, and size information of the memory block.

13. The method of claim 1, wherein the memory block has a size of $2^n$ times of a memory page and dynamically changes in size, wherein n is a constant.

14. The method of claim 13, wherein a start address of the memory block is variably set based on the size of the memory block.

15. An apparatus for managing a disaggregated memory in wherein the apparatus manages a disaggregated memory in a virtual system, the apparatus comprising:
    a memory including a local memory and a remote memory; and
    a processor controlling the memory, wherein
    the processor detects a memory access pattern based on an operation of a virtual machine in a virtual machine node, and
    performs a memory operation by using a memory block in consideration of the memory access pattern,
    wherein the memory access pattern is variably set based on a time at which the operation of the virtual machine is performed, and
    wherein the memory block dynamically changes in size based on the memory access pattern, including the memory block dynamically increasing in size when the memory operation includes a load operation that loads the memory block from the remote memory to the local memory.

16. The apparatus of claim 15,
    wherein the load operation of the memory operation includes an operation of loading at least one memory page from the remote memory to the local memory, and the memory block is configured with a plurality of memory pages, and
    a number of memory pages loaded to the local memory is determined based on a stretch operation.

17. The apparatus of claim 15, wherein the memory operation performed by the processor includes at least one of the load operation, a store operation, an operation of mapping a GPA, and an operation of un-mapping a GPA.

18. A virtual system for managing a disaggregated memory, the system comprising:
    a virtual machine node controlling an operation of a virtual machine; and
    a memory node controlling a memory operation, wherein a disaggregated memory manager of the virtual machine node detects a memory access pattern based on an operation of the virtual machine, and performs a memory operation by using a memory block in consideration of the memory access pattern, wherein the memory access pattern is variable set based on a time at which the operation of the virtual machine is performed, and wherein the memory block dynamically changes in size based on the memory access pattern, including the memory block dynamically increasing in size when the memory operation includes a load operation that loads the memory block from a remote memory to a local memory.

19. The system of claim 18, wherein the memory operation performed by the disaggregated memory manager includes at least one of the load operation, a store operation, an operation of mapping a GPA, and an operation of un-mapping a GPA.

20. The system of claim 18, wherein the load operation of the memory operation is an operation of loading at least one memory page from the remote memory to the local memory, and the memory block is configured with a plurality of memory pages, and a number of memory pages loaded to the local memory is determined based on a stretch operation.

* * * * *